United States Patent [19]

Kassai

[11] Patent Number: 4,706,986
[45] Date of Patent: Nov. 17, 1987

[54] MECHANISM FOR LOCKING OPENED STATE OF BABY CARRIAGE

[75] Inventor: Kenzou Kassai, Osaka, Japan

[73] Assignee: Aprica Kassai Kabushikikaisha, Osaka, Japan

[21] Appl. No.: 891,759

[22] Filed: Jul. 31, 1986

[30] Foreign Application Priority Data

Jul. 31, 1985 [JP] Japan .................................. 60-170416
Aug. 9, 1985 [JP] Japan ........................... 60-123471[U]

[51] Int. Cl.$^4$ ............................................... B62B 7/08
[52] U.S. Cl. ..................................... 280/642; 108/113; 280/647; 280/650; 280/658; 403/85
[58] Field of Search ............... 280/658, 641, 644, 642, 280/647, 650, 651, 640, 42, 47.38; 403/85; 5/99 R, 99 B, 101, 102, 103, 104; 108/112, 113; 297/45

[56] References Cited

U.S. PATENT DOCUMENTS 3,003,163 10/1961 Linden ................................... 5/99 R
3,476,061 11/1969 Takahashi ........................... 108/112
4,243,263 1/1981 Thiboutot ............................... 297/45

Primary Examiner—John J. Love
Assistant Examiner—Eric Culbreth
Attorney, Agent, or Firm—W. G. Fasse; D. H. Kane, Jr.

[57] ABSTRACT

When a baby carriage is in its opened state, the front and rear legs extend in an inverted-V form. Each rear leg is provided with a bracket extending toward the front leg, with a foldable locking rod turnably connected at its opposite ends between the bracket and the front leg. The locking rod is adapted to be maintained in its unfolded state by being held between an attitude control surface fixedly provided on the rear leg and a slider provided on the rear leg and urged by a spring to slide toward the attitude control surface. The slider is formed with an unlocking engagement portion. When the unlocking engagement portion is slid away from the attitude control surface by operating an operating lever, the unlocking engagement portion engages the end of the locking rod to fold the locking rod.

3 Claims, 12 Drawing Figures

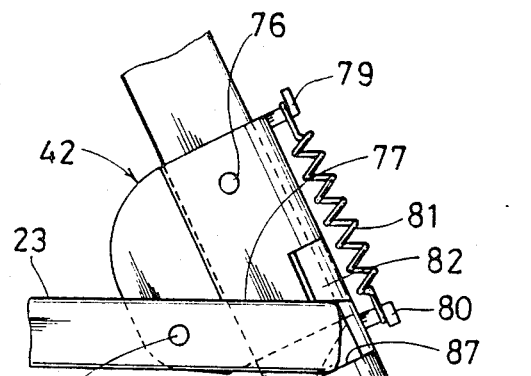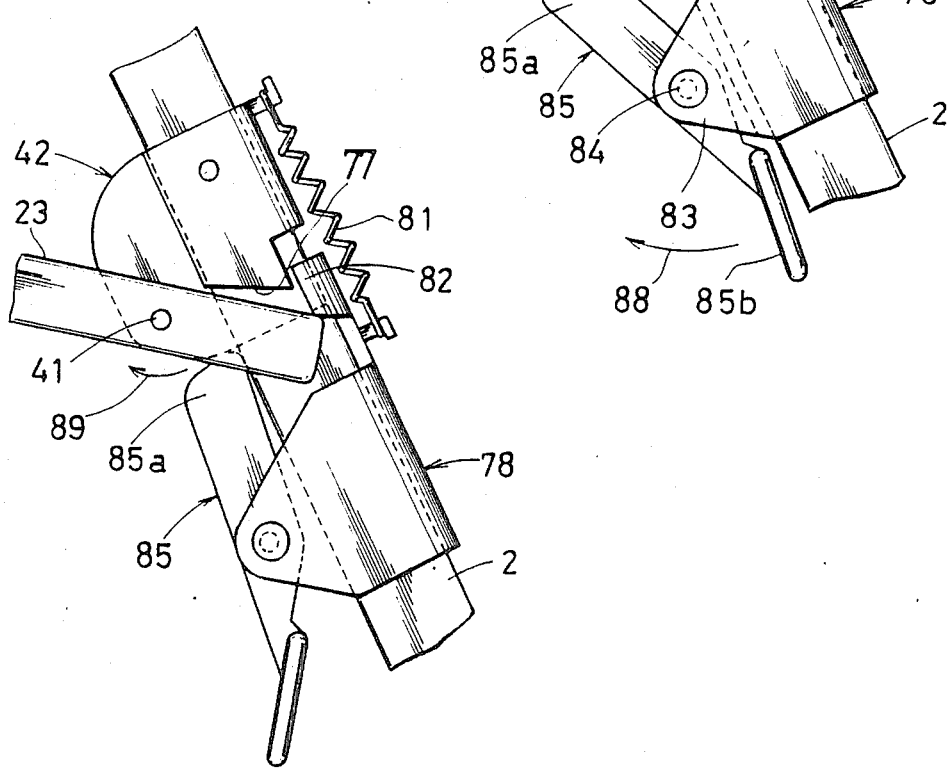

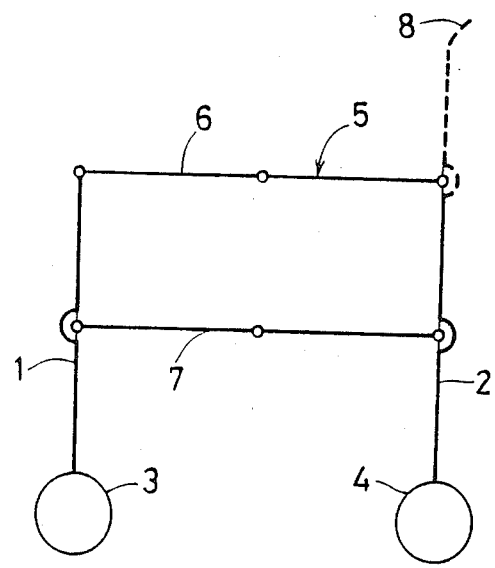
FIG. 7
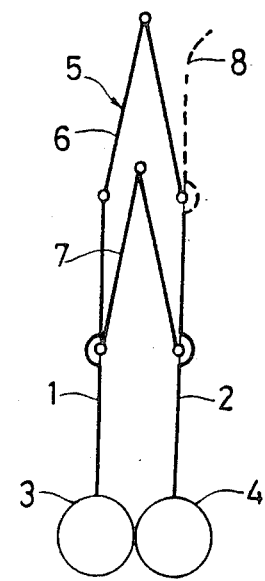
FIG. 8
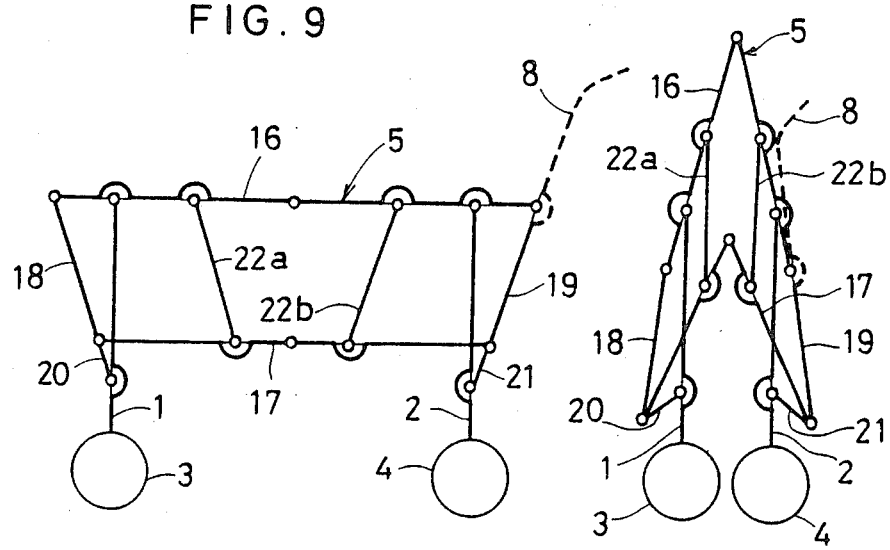
FIG. 9
FIG. 10

MECHANISM FOR LOCKING OPENED STATE OF BABY CARRIAGE

BACKGROUND OF THE INVENTION

1. Field of the Invention

This invention relates to a mechanism for locking the opened state of a foldable baby carriage.

2. Description of the Prior Art

An examination of the history of change of baby carriages with attention paid to their seat sections shows that initially they were of the so-called box type and then changed to the chair type, which has since continued, and baby carriages with chair type seat sections are popular today. In the background of switching from the box type to the chair type, there was a desire for reducing the weight of the baby carriage and making it more compact in the folded state.

Although the chair type baby carriage is convenient for use, the space allotted to its seat section is limited. As a result, the seat section is reduced in size to the extent that it has been difficult to sit or lay a baby there in an easy state.

3. Description of the Related Arts

Thus, considered from the standpoint of a baby, it cannot be denied that it is preferable for a baby carriage to have a box-type seat section or a large seat section equivalent thereto. In this connection, there can be contemplated a skeleton construction for baby carriages, as shown in FIGS. 7 and 8, which allows advantageous attachment of a relatively large seat section and which can be compactly folded. In addition, the baby carriage shown in FIGS. 7 and 8 has not been publicly known yet, but is only described in copending Japanese patent application No. 170416/1985, "Baby Carriage" (filed July 31, 1985).

FIGS. 7 and 8 are diagrammatic side views of an example of a foldable baby carriage to which this invention is applied. In FIG. 1 showing the baby carriage in the opened state, the numeral 1 denotes a front leg as a first leg and 2 denotes a rear leg as a second leg, these front and rear legs 1 and 2 being each provided in a pair. The lower end of the front leg 1 has a front wheel 3, diagrammatically shown, rotatably attached thereto, while the lower end of the rear leg 2 has a rear wheel 4 attached thereto. A seat section (not shown) is positioned so that it extends between the front and rear legs 1 and 2. The seat section may further extend forward and rearward beyond the front and rear legs 1 and 2. Lateral frames 5 are positioned on opposite sides of the seat section. Each lateral frame 5 extends between the front and rear legs 1 and 2 on the same side.

The lateral frame 5, as shown in FIG. 8, is foldable in a lateral plane of the baby carriage. Therefore, when the lateral frames 5 assume the extended state, the front and rear legs 1 and 2 are spaced from each other to establish the opened state of the baby carriage shown in FIG. 7. On the other hand, when the lateral frames 5 assume the folded state, the front and rear legs 1 and 2 move toward each other to establish the closed state of the baby carriage shown in FIG. 8.

In FIGS. 7 and 8, each lateral frame 5 is formed of two foldable lateral rod members 6 and 7. The lateral rod members 6 and 7 are turnably connected at their opposite ends to the front and rear legs 1 and 2 on the same side. Further, the lateral rod members 6 and 7 are disposed side by side and one above the other.

In addition, a push rod 8 for pushing the baby carriage may be mechanically fixed to the rear legs 2, as shown in dotted lines in FIGS. 7 and 8.

Thus, according to the baby carriage shown in FIGS. 7 and 8, the lateral frame 5 itself is foldable, so that even if the lateral frame 5 is increased in longitudinal dimension to lengthen the wheel base between the front and rear wheels 3 and 4 so as to improve the safety feature of the baby carriage and then the seat section is increased in size, the skeleton of the baby carriage can be compactly folded.

Another example of a baby carriage having the same advantage will now be described with reference to FIGS. 9 and 10.

This baby carriage is basically the same as the preceding baby carriage in that it has front legs 1, rear legs 2 and foldable lateral frames 5. Each lateral frame 5 of the baby carriage shown in FIGS. 9 and 10 comprises an upper foldable lateral rod member 16 and a lower foldable lateral rod member 17 which are disposed side by side and one above the other. The upper lateral rod member 16 is turnably connected to the front and rear legs 1 and 2, with its opposite ends extending beyond the front and rear legs 1 and 2. The extended ends of the upper lateral rod member 16 have the upper ends of prop rods 18 and 19 turnable connected thereto. The lower ends of the prop rods 18 and 19 have one of the respective ends of reverse-turn rods 20 and 21 turnably connected thereto, the other ends of said prop rods 20 and 21 being turnably connected to the front and rear legs 1 and 2. The lower lateral rod member is turnably connected at its opposite ends to said one of the respective ends of the reverse-turn rods 20 and 21.

Further, there are provided connecting links 22a and 22b for interconnecting the upper and lower lateral rod members 16 and 17. Thereby, the folding and unfolding movement of one of the upper and lower lateral rod members 16 and 17 is operatively associated with that of the other.

In the two types of baby carriages described above, as can be seen from a comparison between their opened and closed states, when the folding of the lateral frame 5 is inhibited, the opened state of the baby carriage is locked. To achieve such locking, it may be contemplated to provide means for keeping the spacing between the front and rear legs 1 and 2 in its increased state. This will now be described with reference to FIGS. 11 and 12 and in connection with the baby carriage shown in FIGS. 9 and 10.

A locking rod 23 is provided which is turnably connected to at least one of the front legs 1 and the rear leg 2 on the same side. The locking rod 23 is foldable itself and is designed so that its folding can be selectively inhibited. Thus, the arrangement can be made so that unless the locking rod 23 is folded, the closed state as shown in FIGS. 7 and 8 cannot be obtained.

In this connection, to bring the baby carriage now locked in its opened state into its closed state by using such a locking rod 23, first, it is necessary to render the locking rod 23 foldable. Then, as shown in FIG. 12, the closed state of the baby carriage is obtained in which the locking rod 23 together with the upper and lower lateral rods 16 and 17 has been folded.

When the operation for changing the baby carriage from the opened to the closed state is taken into account, it is thought that even if the locking rod 23 is rendered foldable, the locking rod must be operated in the early stage to define the folding direction thereof before it can be actually folded. Otherwise, even if the locking rod 23 is in its foldable state, it could act to resist the front and rear legs 1 and 2 moving toward each other.

SUMMARY OF THE INVENTION

Accordingly, this invention is intended to provide a mechanism which, when an operation is applied to a locking rod, which has been rendered inhibited from folding, to render it foldable, renders the locking rod slightly folded to thereby define the folding direction thereof for the subsequent folding operation.

This invention is applied to a baby carriage which comprises a pair of first legs, a pair of second legs, and a pair of lateral frames each extending between a first leg and a second leg on the same side, each lateral frame being foldable in a lateral plane of the baby carriage, whereby when each lateral frame assumes its unfolded state, the first leg and the corresponding second leg are moved away from each other to establish the opened state of the baby carriage and, on the other hand, when each lateral frame assume its folded state, the first leg and the corresponding second leg are moved toward each other to establish the closed state of the baby carriage. As a mechanism for locking the opened state of such a baby carriage, the following arrangement is employed, whereby the technical problem described above is solved:

At least one of the second legs is provided with a bracket extending toward the first leg on the same side. A foldable locking rod is turnably connected between said bracket and the corresponding first leg;

The second leg is provided with a fixed attitude control surface and a slider, which hold the locking rod therebetween while abutting against the lateral portions of the locking rod, said slider being constantly urged by a spring to move toward the attitude control surface;

An unlocking engagement portion on one side of the locking rod and on the same side of the attitude control surface is formed to extend from the slider; and The slider is provided with an operating lever adapted upon turning to abut against the bracket to slide the slider away from the attitude control surface, whereby the unlocking engagement portion engages the locking rod to move the latter in the folding direction.

In the opened state of the baby carriage, the locking rod is held between the fixed attitude control surface disposed fixedly on the second leg and the slider urged by the spring toward said attitude control surface and is thereby maintained in its unfolded state. That is, the locking rod is thereby inhibited from folding.

To render such a locking rod foldable, the operating lever is operated to turn. Thereby, the slider is slid away from the attitude control surface, first, to cancel the holding on the locking rod, so that the latter is rendered foldable. Further, what should be noted is that since the slide movement of the slider causes the unlocking engagement portion to move as it is engaged with the locking rod, the locking rod is slightly folded in accordance with this movement of the unlocking engagement portion. Therefore, in the subsequent folding operation of the baby carriage, the locking rod will be easily folded since the folding direction of the locking rod has thus been defined.

As described above, according to the invention, the slider is provided with the unlocking engagement portion adapted to fold the locking rod while engaging the latter as the slider is slid; therefore, the locking rod will be folded at the same time as the holding on the locking rod is canceled by operating the operating lever to slide the slider in order to render the locking rod foldable. Therefore, the direction of folding of the locking rod which is to take place during the subsequent folding movement of the baby carriage is defined, thereby facilitating the folding operation of the baby carriage.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 3 through 6 are enlarged views showing a region where a locking rod 23 is attached to a rear leg 2, showing the successive steps of the baby carriage changing from the opened to the closed state; and FIGS. 7 through 12 are views for explaining related arts in the invention, diagrammatically showing baby carriages.

DESCRIPTION OF THE PREFERRED EMBODIMENTS

Figure 1:
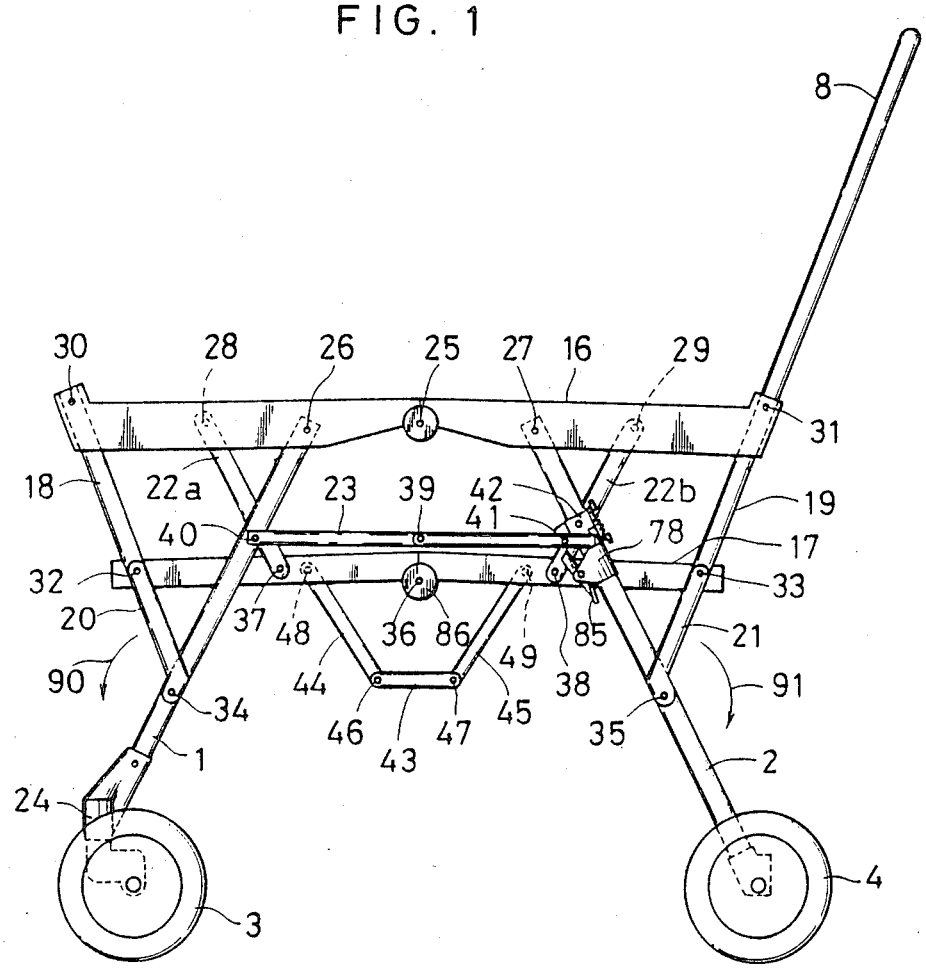
FIGS. 1 and 2 are side views of a skeleton construction for a baby carriage to which an embodiment of the invention is applied, FIG. 1 showing the opened state and FIG. 2 the closed state.
Figure 2:
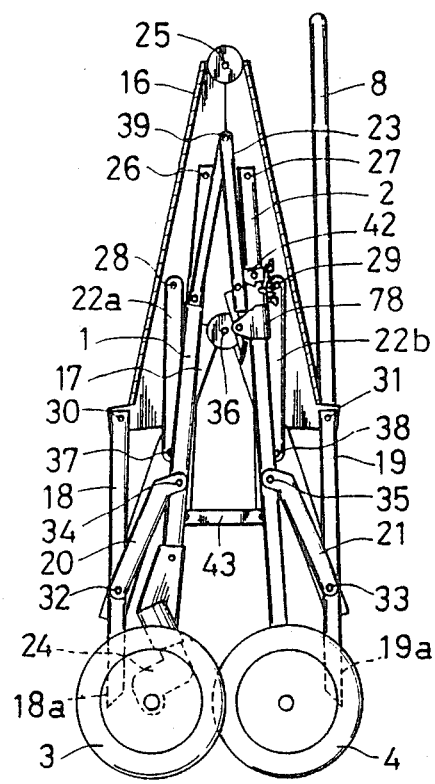
Figure 11:
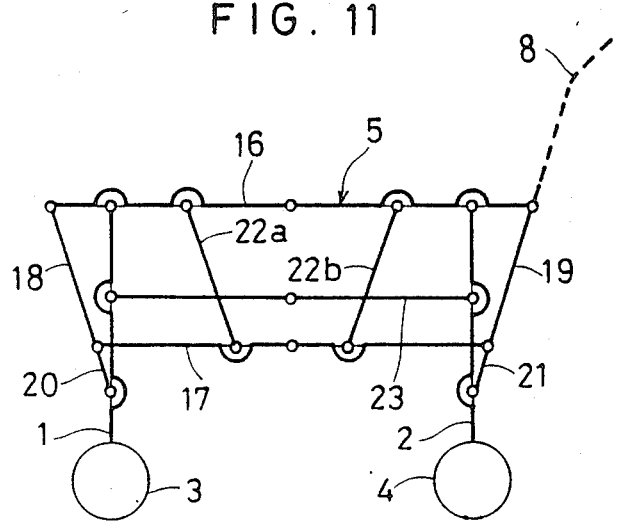

In FIGS. 1 and 2, there are respectively shown the opened and closed states of a baby carriage to which the invention is applied. This baby carriage is the same as the baby carriage shown in FIGS. 11 and 12 in the manner of connection of links and includes all the components shown in FIGS. 11 and 12. Thus, like reference characters are applied to like members. The following description is given on the basis of the opened state of the baby carriage unless otherwise specified.

The front and rear legs 1 and 2 assume an inverted V shape, having front and rear wheels 3 and 4 rotatably attached to their lower ends. Particularly, it is preferable to use a caster 24 through which the front wheel 3 is attached to the front leg 1.

The upper lateral rod member 16 has a folding point 25 at the middle. At positions a predetermined distance away to opposite sides from the folding point 25, the upper ends of the front and rear legs 1 and 2 are turnably connected to the upper lateral rod member 16 through pivot points 26 and 27.

The portions of the upper lateral rod member 16 further projecting from the pivot points 26 and 27 have the upper ends of connecting links 22a and 22b turnably connected thereto through pivot points 28 and 29. In addition, the positional relationship between the pivot points 26 and 28 and between the pivot points between 27 and 29 is reversed from that for the baby carriage shown in FIG. 11.

The upper ends of the prop rods 18 and 19 are turnably connected to the opposite ends of the upper lateral rod member 16 through pivot points 30 and 31.

The lower ends of the prop rods 18 and 19 have one of the respective ends of the reverse-turn rods 20 and 21 turnably connected thereto through pivot points 32 and 33. The other ends of the reverse-turn rods 20 and 21 are turnably connected to the front and rear legs 1 and 2 through pivot points 34 and 35, respectively.

The lower lateral rod member 17 has a folding point 36 at the middle. At positions a predetermined distance away to opposite sides from the folding point 36, the lower ends of said connecting links 22a and 22b are turnably connected to the lower lateral rod member 17 through pivot points 37 and 38.

The opposite ends of the lower lateral rod member 17 are turnably connected to the reverse-turn rods 20 and 21 and prop rods 18 and 19 through said pivot point 32 and 33 disposed at one of the respective ends of the reverse-turn rods 20 and 21.

A locking rod 23 has a folding point 39 at the middle. Further, fixed on the rear leg 2 is a backet 42 which extends from the rear leg 2 toward the front leg 1 disposed on the same side. The locking rod 23 is turnably connected to the front and rear legs 1 and 2 through a pivot point 40 on the front leg 1 and a pivot point 41 on the bracket 42, respectively. The provision of such a locking rod 23 is sufficient so long as it connects one front leg 1 and the rear leg 2 on the same side; however, two locking rods 23 may be provided for connecting each front leg 1 and each rear leg 2 on the same side. In addition, the locking rod 23 and the bracket 42 and their related arrangements will be later described with reference to FIGS. 3 through 6.

Shown below the lower lateral rod member 17 is a footrest 43. The footrest 43 is suspended from the lower lateral rod member 17 through suspension links 44 and 45. The suspension links 44 and 45 are turnably connected to the footrest 43 through pivot points 46 and 47 and also to the lower lateral rod member 17 through pivot points 48 and 49. In addition, in the baby carriage shown in FIGS. 1 and 2, the length of the upper and lower lateral rod members 16 and 17 is selected in such a manner that, though not shown, two opposed seat sections can be installed. The seat surfaces of these seat sections are formed along both sides of the folding point 36 on the lower lateral rod member 17. Therefore, the aforesaid footrest 43 performs the function of supporting the feet of a baby set on one of said seated sections. Of course, these two seat sections may be used to set two babies thereon.

Figure 12:
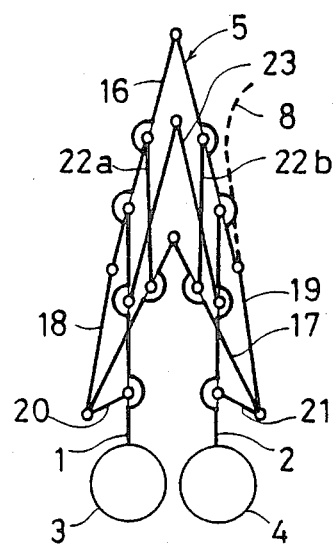

In the opened state of the baby carriage shown in FIG. 1, the lower ends of the prop rods 18 and 19 abut against the front and rear legs 1 and 2. This state, though not altogether clear from FIG. 1, could be inferred from the lengths of the pivot points 32 and 33 for the lower ends 18a and 19a, as shown in FIG. 12, of the prop rods 18 and 19. The obliquely cut end surfaces of the lower ends 18a and 19a are adapted to contact the lateral surfaces of the front and rear legs 1 and 2. In this manner, the terminal end of the turning movement of the prop rods 18 and 19 relative to the reverse-turn rods 20 and 21 is defined and so is the terminal end of the turning movement of the reverse-turn rods 20 and 21 relative to the front and rear legs 1 and 2.

Further, when the baby carriage is in the opened state, the upper and lower lateral rod members 16 and 17 are at the terminal positions in the folding movement performed through the folding points 25 and 36, and cannot perform a folding movement which displaces the folding points 25 and 36 further downward from the state of FIG. 1; they can perform such a folding movement only as will displace the folding points 25 and 36 upward.

In the state of FIG. 1, the fact that the locking rod 23 maintains its linear state contributes greatly to keeping the opened state of the baby carriage. For example, if the front wheel 3 encounters some obstacle lying forwardly of said front wheel when the baby carriage is being pushed, a rearwardly directed force is imparted to the front wheel 3. In response thereto, the lower end of the front leg 1 is forced to move toward the lower end of the rear leg 2, with the result that the opening angle between the front and rear legs 1 and 2 which are opened in V-shape tends to be closed. In response thereto, the upper lateral rod member 16 would be sometimes folded through the folding point 25, causing undesirable folding of the baby carriage. It is the locking rod 23 that advantageously prevents this. The arrangement related to the locking rod 23 will now be described with reference to FIGS. 3 through 6 while also describing the folding operation of the baby carriage. In addition, FIGS. 3 through 6 show the location, enlarged, in which the locking rod 23 is attached to the rear leg 2.

FIG. 3 corresponds to the opened state of the baby carriage shown in FIG. 1. The locking rod 23 is turnably attached through the pivot point 41 located on the bracket 42, as described previously. The bracket 42 is fixed to the rear leg 2 as by a rivet 76. The bracket 42 is formed with an attitude control surface 77 adapted to abut against the lateral edge of the locking rod 23. Positioned below the bracket 42 is a slider 78 which is slidable on the rear leg 2. The bracket 42 is provided with a hook 79, while the slider 78 is provided with a hook 80, with a tension spring 81 stretched between said hooks 79 and 80. Thereby, the slider 78 is constantly urged to slide on the rear leg 2 upward, i.e., toward the attitude control surface 77.

The slider 78 is formed with an unlocking engagement portion 82 which is disposed on the same side as the attitude control surface 77 and in a position where it can engage the locking rod 23.

Further, the slider 78 is formed with a ledge 83 to which an operating lever 85 is turnably attached through a pivot pin 84. One end of the operating lever 85, which is an active end 85a, is positioned within the range of the thickness of the bracket 42 is positioned where it does not interfere with the locking rod 23. The other end of the operating lever 85 is formed with an operating end portion 85b. The operating end portion 85n forms a relatively wide surface which extends in the direction of the surface which is at right angles to the plane in which the operating lever 85 is turned. The operating end portion 85b is adapted to engage a boss 86 (FIG. 5), which surrounds the folding point 36 of the lower lateral rod member 17, when the baby carriage is changed from the opened to the closed state, as will be later described.

In FIG. 3, the tip end of the locking rod 23 extending beyond the pivot point 41 is brought into close contact with the attitude control surface 77 of the bracket 42 by the upper end surface 87 of the slider 78 urged by a tension spring 81. Thereby, as shown in FIG. 1, the locking rod 23 is maintained in the linear state, thus maintaining the opened state of the baby carriage.

To close the baby carriage, first, the lever 85 must be operated to turn in the direction of arrow 88. In response thereto, the active end 85a of the operating lever 85 moves to lower surface of the bracket 42 while the former is kept in contact with the latter, as shown in FIG. 4. Further turning movement of the operating lever 85 is inhibited by the active end 85a abutting against the rear leg 2. In this manner, the slider 78 is slid downward on the rear leg 2 against the elastic force of the tension spring 81 until the active end 85a comes in contact with the lower end of the bracket 42. Accompanying this downward slide movement, the lock canceling engagement portion 82 engages the end of the locking rod 23 to turn the locking rod 32 in the direction of arrow 89. In response to this turning movement, the locking rod 23 is folded around the folding point 39 into an inverted V-shape as a whole.

In response to the aforesaid folding of the locking rod 23, the front and rear legs 1 and 2 are slightly turned in the directions which cause the front and rear wheels 3 and 4 to move toward each other. In response thereto, the upper lateral rod member 16 is folded to displace its folding point 25 slightly upward while the lower lateral rod member 17 is folded through the connecting links 22a and 22b to displace its folding point 36 slightly upward. Once the upper and lower lateral rod members 16 and 17 as well as the locking rod 23 have their direction of folding movement thus defined, the subsequent folding operation proceeds comparatively easily. For example, the folding operation that follows is effected by applying a force which causes the opposite ends of the upper lateral rod member 16 to move toward each other. In response thereto, the upper lateral rod member 16 is further folded through the folding point 25. And the folding movement of the upper lateral rod member 18 is transmitted to the lower lateral rod member 17 through the connecting links 22a and 22b, whereby the lower lateral rod member 17 is likewise folded.

Further, the folding movement of the upper lateral rod member 16 displaces the pivot points 26 and 27 upward and the pivot points 30 and 31 downward. Therefore, the front and rear legs 1 and 2 are moved toward each other, while the reverse-turn rods 20 and 21 are turned in the directions of arrows 90 and 91, respectively, shown in FIG. 1, so that the prop rods 18 and 19 are also turned to becomes parallel to each other.

Figure 5:
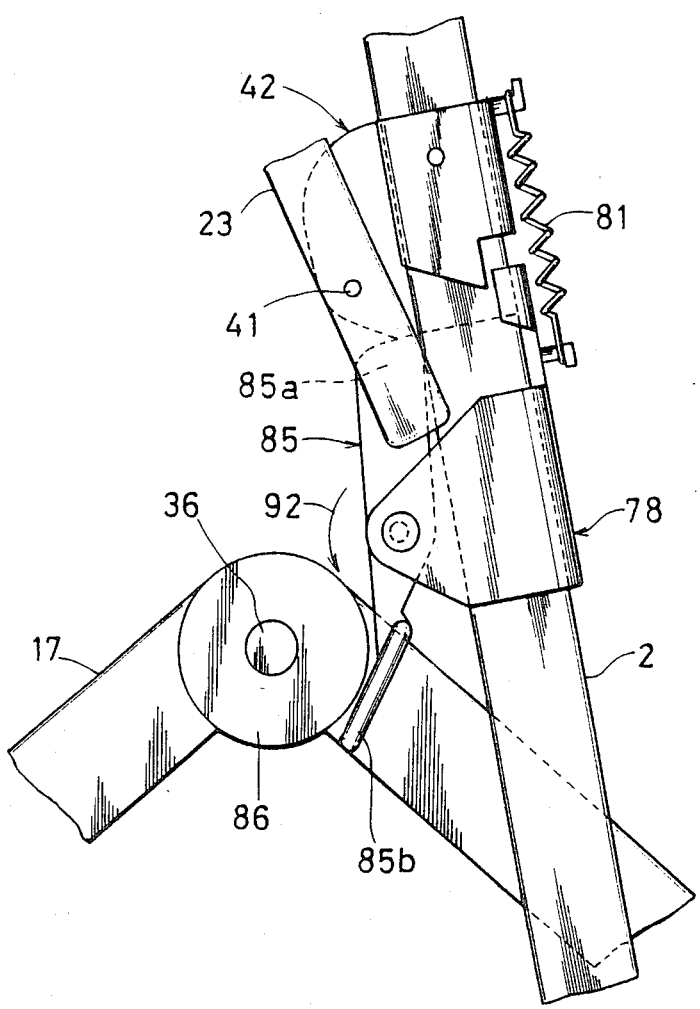

FIG. 5 shows a state resulting from the aforesaid operation proceeding to some degree. In the figure, there appears the lower lateral rod member 17 being folded into an inverted V-shape. With attention paid to the position of the boss 86 formed to surround the folding point 36 of the lower lateral rod member 17, it is seen that it has been brought to a position where it can abut against the operating end portion 85b of the operating lever 85. When the folding operation further proceeds from the state shown in FIG. 5, the boss 86 is displaced while contacting the operating end portion 85b, as shown in FIG. 6, thus giving the operating lever 85 a force which causes it to turn in the direction of arrow 92.

Figure 6:
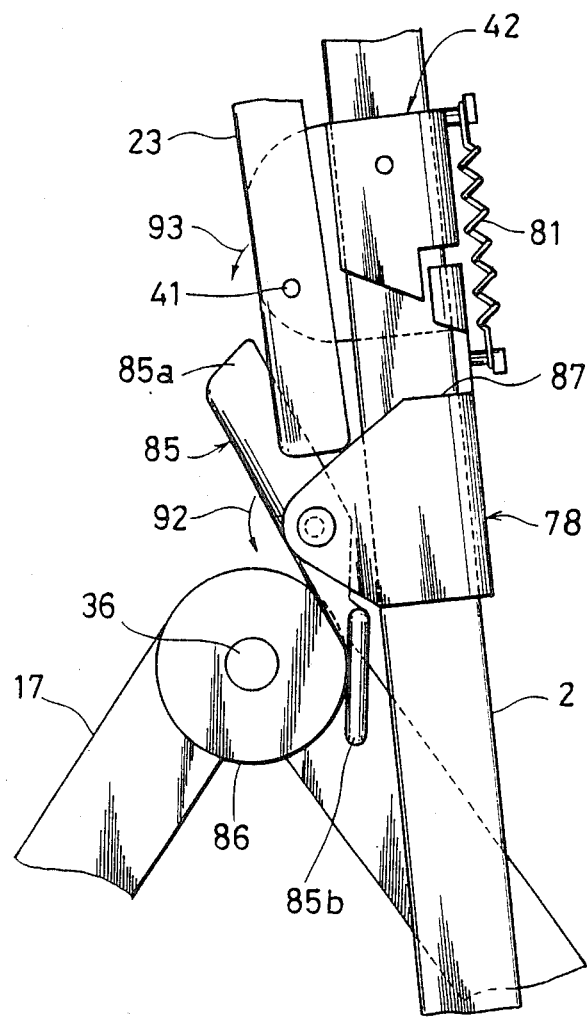

As shown in FIG. 6, when the operating lever 85 is turned, the locking rod 23 has already been turned until it is substantially parallel to the rear leg 2. When the operating lever 85 has been turned in the direction of arrow 92, as described above, its active end 85a leaves the lower surface of the bracket 42 and the slider 78 tends to slide on the rear leg 2 upward under the action of the elastic force of the tension spring 81. In the state shown in FIG. 6, the slider 78 has slid until it abuts the end of the locking rod 23. The attitude of the operating lever 85 shown in FIG. 6, when seen from its connection with the rear leg 2, is substantially the same as that shown in FIG. 3.

The folding operation further proceeds from the state shown in FIG. 6 and finally the closed state of the baby carriage shown in FIG. 2 is obtained.

The direction of the front wheel 3 shown in FIG. 2 is one which results from the direction of the front wheel 3 shown in FIG. 1 being turned through 180 degrees. This is due to the fact that the front wheel 3 is supported by the front leg 1 through the caster 24, and in FIG. 2, the axle of the front wheel 3 is positioned forwardly of the caster 24. Thereby, the front wheel 3 is placed on a level with the rear wheel 4, so that the baby carriage can stand by itself. In addition, even if the baby carriage is folded with the front wheel 3 maintained in the state shown in FIG. 1, there will be no interference with the folding operation.

A brief description will now be given of an operation for changing the closed state of the baby carriage shown in FIG. 2 to the opened state shown in FIG. 1. This operation, which is effected by reversely follows the operation described above, will now be described with particular attention paid to the action of the locking rod 23.

In the initial stage of the operation for opening the baby carriage, the state shown in FIG. 6 is obtained. When the baby carriage is further opened from this state, the locking rod 23 is turned around the pivot point 41 in the direction of arrow 93. During this turning movement, since the slider 78 is constantly urged by the tension spring 81 to slide upward, it slides on the rear leg 2 while maintaining its state of contact with the end of the locking rod 23. And when the baby carriage has been opened, as shown in FIG. 3, the slider 78 pushes up the end of the locking rod 23 by its upper end surface 87. Thereby, the linear state of the locking rod 23 shown in FIG. 1 is automatically obtained.

While the invention has so far been described in connection with the illustrated embodiments, it is possible to make some modifications within the scope of the invention.

For example, in the illustrated embodiments, the attitude control surface 77 has been formed as a portion of the bracket 42, but a separate member forming the attitude control surface may be fixed to the rear leg.

Further, the tension spring 81 directly connected to the bracket 42 has been used for urging the slider to move toward the attitude control surface, but such a spring may be replaced by a compression spring and its manner of attachment may be changed. In brief, any spring may be used provided that it urges the slide to move toward the attitude control surface.

Although the present invention has been described and illustrated in detail, it is clearly understood that the same is by way of illustration and example only and is not to be taken by way of limitation, the scope of the present invention being limited only by the terms of the appended claims.

What is claimed is:

1. A mechanism for locking the opened state of a baby carriage, which baby carriage comprises a pair of first legs, a pair of second legs, and a pair of lateral frames each extending between said first leg and said second leg on the same side, each said lateral frame being foldable in a lateral plane of the baby carriage, whereby when each said lateral frame assumes its unfolded state, said first leg and said corresponding second leg are moved away from each other to establish the opened state of the baby carriage and, on the other hand, when each said lateral frame assumes its folded state, said first leg and said corresponding second leg are moved toward each other to establish the closed state of the baby carriage, said mechanism being characterized in that:

at least one of said second legs is provided with a bracket extending toward said first leg on the same side, with a foldable locking rod turnably connected between said bracket and said corresponding first leg, said second leg is provided with a fixed attitude control surface and a slider, which hold said locking rod therebetween while abutting against lateral portions of said locking rod, said slider being constantly urged by a spring to move toward the attitude control surface;

an unlocking engagement portion on one side of said locking rod and on the same side of said attitude control surface is formed to extend from said slider; and said slider is provided with an operating lever adapted upon turning to abut against said bracket to slide said slider away from said attitude control surface, whereby said unlocking engagement portion engages said locking rod to move the latter toward the folded state.

2. A mechanism for locking the opened state of a baby carriage as set forth in claim 1, wherein said attitude control surface is formed as a portion of said bracket.

3. A mechanism for locking the opened state of a baby carriage as set forth in claim 2, wherein said spring is a tension spring connected between said bracket and said slider.

* * * * *